Aug. 4, 1970  R. E. FRITSCH  3,522,424
SEARCHLIGHT APPARATUS
Filed April 12, 1968  3 Sheets-Sheet 1
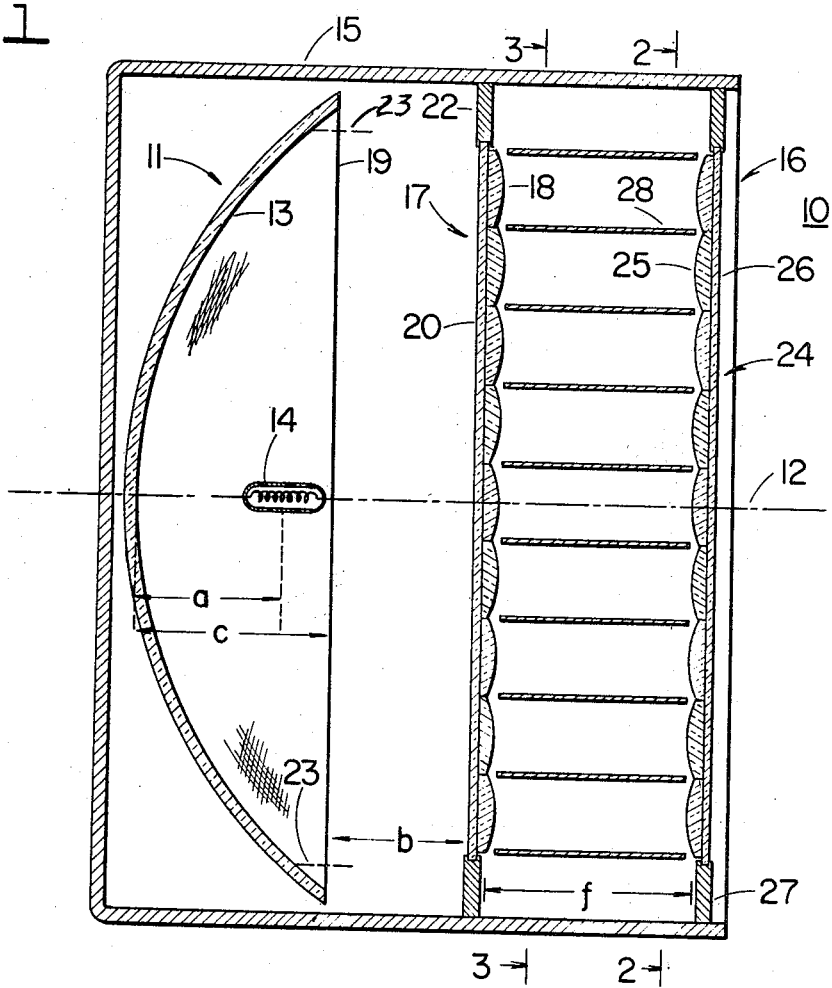
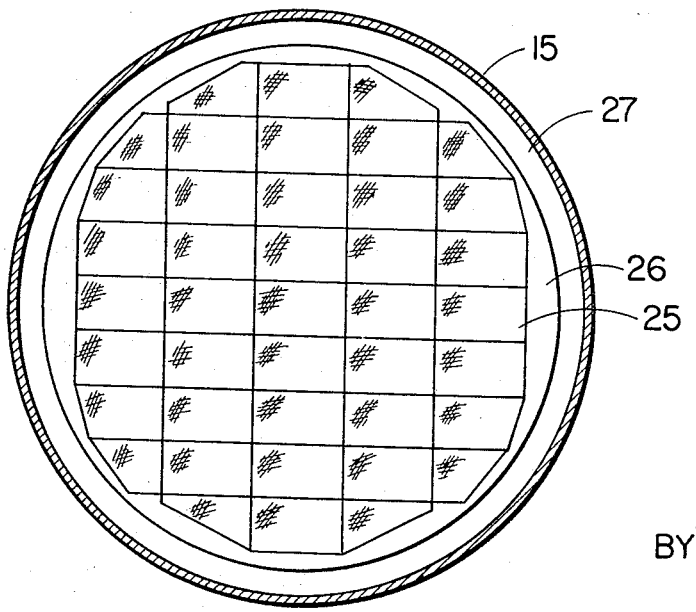
INVENTOR
ROBERT E. FRITSCH
BY Wood, Dust, Irish & Lundy
ATTORNEYS Aug. 4, 1970  R. E. FRITSCH  3,522,424
SEARCHLIGHT APPARATUS
Filed April 12, 1968  3 Sheets-Sheet 2
FIG_3
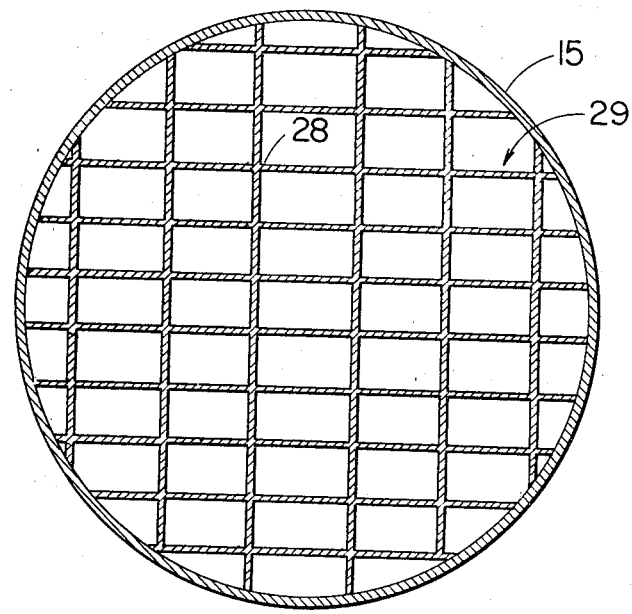
FIG_4
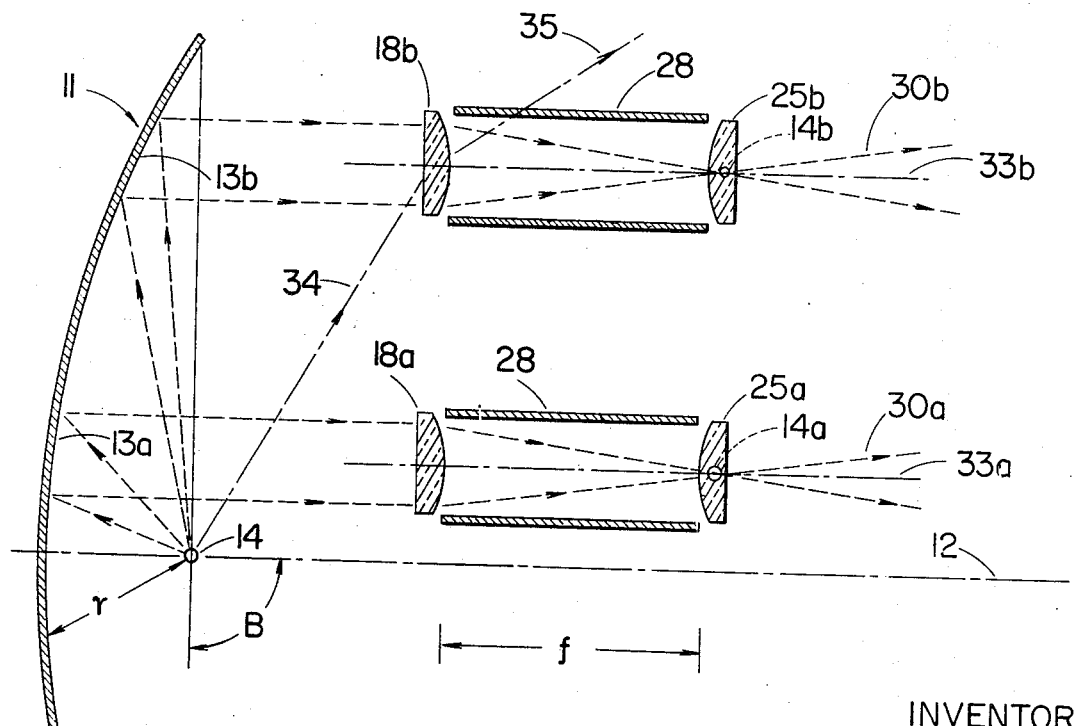
INVENTOR
ROBERT E. FRITSCH
BY Hood, Gust, Irish & Lundy
ATTORNEYS Aug. 4, 1970    R. E. FRITSCH    3,522,424
SEARCHLIGHT APPARATUS
Filed April 12, 1968    3 Sheets-Sheet 3
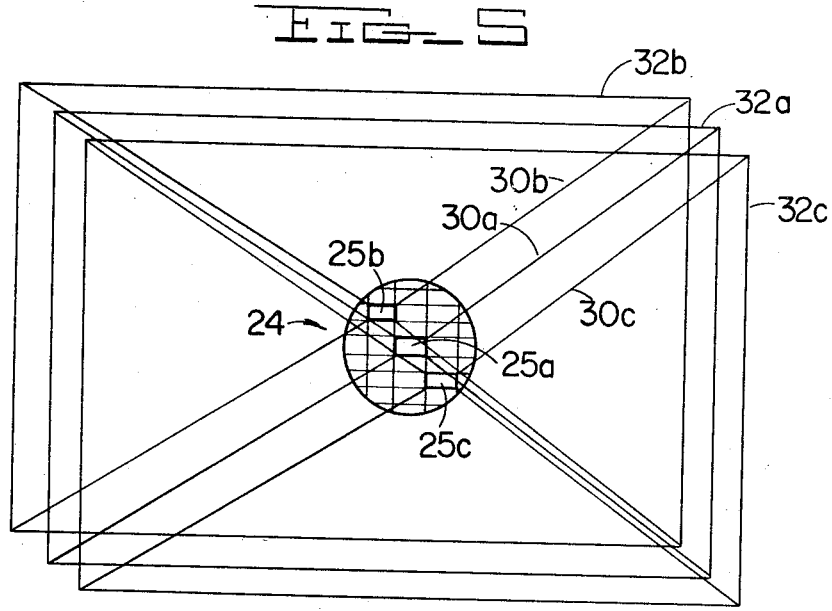
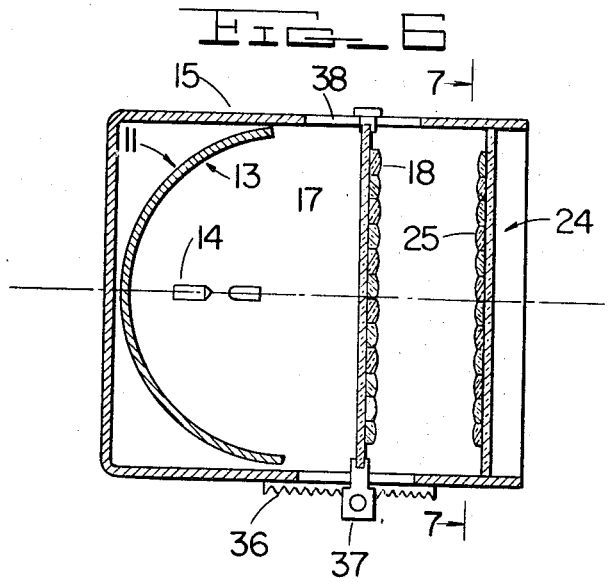
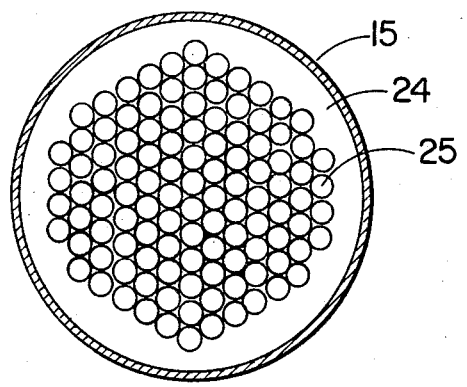
INVENTOR
ROBERT E. FRITSCH
BY Hood, Gust, Irish & Lundy
ATTORNEYS

United States Patent Office 3,522,424
Patented Aug. 4, 1970

3,522,424
SEARCHLIGHT APPARATUS
Robert E. Fritsch, Fort Wayne, Ind., assignor to International Telephone and Telegraph Corporation, Nutley, N.J., a corporation of Delaware
Filed Apr. 12, 1968, Ser. No. 720,807
Int. Cl. F21v *11/06*
U.S. Cl. 240—41.3        15 Claims

ABSTRACT OF THE DISCLOSURE

A searchlight has a substantially parabolic reflector with a light source positioned on the axis of the reflector at its focal point. A first matrix of condensing lens elements has substantially the same outside diameter as the effective aperture of the reflector is disposed in a plane normal to the axis of the reflector and spaced axially from the source. A second matrix of diverging lens elements which has substantially the same outside diameter as the effective aperture of the reflector is disposed in a plane normal to the axis and spaced axially from the first matrix, the second matrix has the same number of lens elements as the first matrix with each lens element being axially aligned with a respective lens element of the first matrix. In the preferred embodiment, each of the lens elements has the same focal length, each lens element of the second matrix is substantially the same size and configuration as the respective lens element of the first matrix, and the second matrix is spaced from the first matrix by that focal length. A plurality of tubular elements joined in a honeycomb structure is provided each extending between respective lenses of the first and second matrices in order to confine and direct light passing through each lens of the first matrix in a path to impinge upon only the respective lens of the second matrix.

BACKGROUND OF THE INVENTION

Field of the invention

This invention relates generally to searchlights, and more particularly to searchlight apparatus providing accurately controlled beam dimensions and uniform illumination in a far field with minimum light flux outside of the intended beam.

Description of the prior art

Conventional searchlights known to the present applicant have employed a parabolic reflector with a light source at or near the focal point of the reflector. Such prior searchlights by reason of the non-uniform light emission properties of the light source and the difference in magnification of the reflector between points adjacent its axis and points toward its outer extremity have provided non-uniform illumination in a far field, the beam intensity varying from high brightness or a "hot spot" at center to a much lower level at its extremities.

In order to provide more uniform illumination of the field, light projection systems have been proposed employing a pair of lenticular lens plates axially spaced from the light source, each of the lenticular plates comprising a matrix of closely spaced, small individual elements, there being a corresponding lens element in the second plate for each lens element in the first plate. Such prior lenticular plates served to break up or dissect the non-uniform reflector field into many individual uniform fields and to recombine those individual fields into a combined field having a resultant more uniform intensity.

Such prior light projection systems using lenticular plates have been employed both for near field illumination, as for picture projectors, and for far field illumination, as in searchlights. In the case of such near field illuminating systems, additional collimating and converging lenses have been employed. In the case of far field illuminators, the outer-most lenticular plate has been incorporated in rotating or lateral shifting arrangements to provide either spot or flood illumination.

SUMMARY OF THE INVENTION

Prior searchlight apparatus known to the present applicant does not efficiently provide accurately controlled beam dimensions with uniform illumination in the far field and minimum light flux outside of the intended beam. This invention, in its broader aspects, provides searchlight apparatus comprising a substantially parabolic reflector having an axis and a focal point on its axis. A light source is positioned adjacent the focal point and the reflector has an effective aperture for reflection of light emitted by the source. A first matrix of closely spaced, relatively small condensing lens elements is disposed in a plane normal to the axis and spaced axially from the source for receiving light from the reflector, the first matrix having substantially the same outside diameter as the effective aperture, each lens element of small diverging lens elements is provided disposed in a plane normal to the axis and spaced axially from the first matrix, the second matrix having substantially the same outside diameter as the effective aperture, and each of the lens elements of the second matrix having the same predetermined focal length. The second matrix has the same number of lens elements as the first matrix with each lens element of the second matrix being axially aligned with the respective lens element of the first matrix for receiving light therefrom. In the preferred embodiment, each lens element of the second matrix is substantially the same size and configuration as the respective lens element of the first matrix, the lens elements of the first and second matrices have the same focal length, and the second matrix is spaced from the first matrix by substantially that focal length. In one embodiment, means are provided for confining and directing light passing through each lens of the first matrix in a path to impinge upon only the respective lens of the second matrix. In another embodiment, means is provided for selectively adjusting the axially spacing between the matrices.

It is accordingly an object of the invention to provide improved searchlight apparatus.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a schematic cross-sectional view showing the preferred embodiment of the invention;

FIG. 2 is a cross-sectional view taken along the line 2—2 of FIG. 1;

FIG. 3 is a cross-sectional view taken along the line 3—3 of FIG. 1;

FIG. 4 is a schematic view useful in explaining the mode of operation of the invention;

FIG. 5 is a diagrammatic view illustrating the uniform illumination in the far field provided by the invention;

FIG. 6 is a schematic cross-sectional view showing another embodiment of the invention; and FIG. 7 is a cross-sectional view taken along the line 7—7 of FIG. 6.

DESCRIPTION OF THE PREFERRED EMBODIMENTS

Referring now to FIGS. 1 through 5 of the drawings, the illustrated embodiment of the invention, generally indicated at 10, comprises a parabolic reflector 11 having an axis 12, the cross-section of the reflective surface 13 of reflector 11 taken in a plane normal to the axis 12 being circular and the curve of any section of the reflective surface 13 taken in a plane including the axis 12 being defined in polar coordinates by the equation:

$$r = \frac{2a}{1-\cos B}$$

where $a$ is the focal length.

A high intensity light source 14, which may be a coiled filament tungsten lamp, as shown schematically in FIG. 1, or a xenon arc lamp, is supported by conventional means (not shown) with its center substantially at the focal point of the parabolic reflecting surface 13. An enclosing case 15 is provided having an open end 16 through which the light is projected.

A first lenticular matrix 17 of relatively small condensing lens elements 18 is provided within the housing 15 spaced axially from the outer edge 19 of reflector 11 and disposed in a plane normal to axis 12. In the illustrated embodiment, matrix 17 comprises a circular glass plate 20 supported within the housing 15 by a metal mounting ring 22. In this embodiment, lens elements 18 are rectangular, other than those adjacent the periphery of the plate 20 which are cut-off to conform thereto, as seen in FIG. 2, and are of the same size, again other than those adjacent the periphery. Lens elements 18 are adhered to the plate 20 by suitable transparent adhesive. The matrix 17 of lens elements 18 have substantially the same outside diameter as the effective aperture of the reflective surface 13 of the reflector 11, as indicated by the dashed lines 23.

A second lenticular matrix 24 of relatively small, diverging or projecting lens elements 25 is provided within the housing 15, normal to the axis 12, and axially spaced from the first matrix 17. Matrix 24 comprises a circular, transparent glass plate 26 supported in housing 15 by a metal mounting ring 27. Each of the lens elements 25 of the second matrix 24 is axially aligned with a respective lens element 18 of the first matrix 17 and thus, lens elements 25 and 18 are equal in number. In this embodiment, lens elements 25 of the second matrix 24 are substantially of the same size and configuration as the lens elements 18 of the first matrix 17 and thus, the arrangement and configuration of the lens elements 18 of the matrix 17 will be identical to the arrangement and configuration of the lens elements 25 of the matrix 24 as shown in FIG. 2. Lens elements 25 are again adhered to the glass plate 26 by a suitable transparent adhesive. In the preferred embodiment, each of the lens elements 18 and 25 has the same focal length $f$ and the two matrices 17 and 24 are axially spaced apart by the focal length $f$, as shown in FIG. 1.

In the preferred embodiment, a plurality of tubular elements 28 extend axially between each respective pair of aligned lens elements 18 and 25, the tubular elements 28 having the same cross-sectional configuration as the respective lens elements at each end. In the illustrated embodiment, tubular elements 28 are formed in a honeycomb structure 29 mounted within the housing 15. The tubular elements 28 preferably have their interior surfaces blackened and as will hereinafter be described, function to prevent "cross-talk" between adjacent pairs of lens elements 18 and 25.

Referring now specifically to FIG. 4, it will be seen that each lens doublet 18 and 25 functions as a small projector with the first lens 18 being the condenser lens and the second lens 25 being the projection lens, i.e. a diverging lens. Referring specifically to the lens pair 18a and 25a which is adjacent the axis 12, lens 18a receives light from the parabolic reflector surface 13a which is imaged into infinity. Lens 18a thus produces an image of the light source 14 at a distance $f$ from lens 18a. The size of that image is determined by the size of the light source and the combined magnification produced by the parabolic reflective surface 13 and the lens 18, as given by the equation:

$$l_{s1} = \frac{f}{r} l_s$$

where $l_s$ = length of the light source 14
$r$ = path length from focal point of paraboloid to surface reflecting light through lens
$f$ = focal length of lens 18
$l_{s1}$ = length of image produced by lens 18 at lens 25

It will thus be seen that the image 14a focused on lens 25a by lens 18a will be larger than the image 14b focused on lens 25b by lens 18b. It will further be seen that the lens doublet 18a and 25a projects the light received from the incremental area 13a of reflective surface 13, as shown by the dashed lines 30a, whereas the lens doublet 18b and 25b projects the light received from the incremental area 13b of the parabolic reflective surface 13, as shown at 30b.

Thus, while the total light reflected by the parabolic surface 13 from the light source 14 is non-uniform in intensity, the light projected by each lens doublet 18 and 25 from the respective incremental area of the parabolic surface 13 is substantially uniform in intensity.

The focal length of the paraboloid and the size and focal length of the lens elements 18 and 25 are chosen so that the size of the image of the light source 14 does not exceed the size of the lenses so that all the light intercepted by each lens 18 is directed to respective lens 25, i.e. the condenser function. Further, the size and focal length of elements 18 and 25 are chosen to produce the desired beam shape and angular divergence. It will now be seen that each projection lens 25 forms an image of lens 18 at infinity. Thus, since each lens 18 is uniformly illuminated, the spot of light produced by each lens 25 in the far field will be of uniform intensity. Referring additionally to FIG. 5, it will be seen that the spot of light 32 projected in a far field plane will be of the same configuration as the respective lens 25, i.e. rectangular in this instance, and that at some finite distance from the projection lenses 25, the projected beams 30 will overlap to form a composite illuminated spot. It will further be seen that the projected beam 30 from each lens 25 is symmetrical about an axis 33 parallel with axis 12 of the reflector 11. Thus, once the projected beams 30 have overlapped, the respective spots projected on a plane in the far field will be spaced apart by the same spacing as the respective projection lenses 25. Therefore, assuming that the spacing from the radially innermost projection lenses 25a and the radially outermost projection lenses 25b and 25c is seven inches, the projected spots 32b and 32c at a distance of one thousand feet from the projection lenses 25 will still be spaced or offset from the projected spot 32a by only the same seven inches. Thus, the composite projected spot in a plane in the far field resulting from all of the projected spots from all of the projection lenses 25 has essentially the same configuration as each of the lenses 25 and is uniformally illuminated. Thus, the final searchlight beam at and beyond a reasonable distance from the searchlight, e.g. over one hundred feet from a fifteen inch searchlight, is the summation of all of the individual lens doublet spot images of uniform intensity, those individual images being substantially in registry and thus producing a composite summed spot of uniform intensity.

Referring again to FIG. 4, it will be seen that with an unshielded light source 14, it is possible for light to be received by a condensing lens 18 directly from the light source, as indicated by the dashed line 34, in addition to the reflected light received from the incremental area of the parabolic reflective surface 13. This light received directly by the lens 18 from the light source 14, will be refracted by the lens 18 and emanate therefrom in a direction suggested by the dashed line 35. It will be readily seen that this light received directly from the light source 14 will thus be directed by lens 18 to impinge upon an adjacent projection lens 25 rather than upon the respective axially aligned projection lens, as intended. This condition results in "cross-talk" which causes stray light to be produced outside of the primary beam. Further, if by reason of the length of the light source 14, the image 14a focused on the projection lens 25a by the condensing lens 18a should be longer than the respective dimension of the lens 25a, a part of the image 14a would thus be focused upon an adjacent projection lens 25, again resulting in "cross-talk." The tubular elements 28 extending between the respective lens doublets 18 and 25 serve to confine the light from a respective condensing lens 18 onto only the respective projection lens 25 thus effectively eliminating the "cross-talk" condition.

Referring now to FIGS. 6 and 7 in which like elements are indicated by like reference numerals, it is possible to vary the width of the projected beam and thus the size of the composite spot in the far field by defocusing of the projection lens matrix 24 with respect to the condensing lens matrix 17 which may be accomplished by changing the axial spacing between the two matrices. Preferably, the projection matrix 24 remains fixed with respect to the housing 15 while the condensing lens matrix 17 is mounted for selective axial adjustment in any suitable fashion, as by means of a rack 36 and manually adjusted cooperating gear or worm 37, this axial adjustment of the condensing lens matrix 17 being accommodated by longitudinally extending slots 38 formed in housing 15. It will be understood that movement of the condensing lens matrix 17 toward the projection lens matrix 24 will broaden the projection beam thereby to provide a larger projected spot in the far field, while movement of the condensing lens matrix 17 away from the projecting lens matrix 24 will provide a smaller image.

In the embodiment shown in FIGS. 6 and 7, the light source 14 is shown in the form of an arc lamp, such as a xenon arc, and the lens elements 18 and 25 are shown as being circular rather than rectangular as in the case of the embodiment of FIGS. 1, 2, and 3.

It will be observed that the tubular elements 28 are not employed in the embodiment of FIGS. 6 and 7. With a small concentrated light source, such as a xenon arc, it is possible to shield the light source so as to prevent direct radiation therefrom to the condensing lens elements 18, thus eliminating that source of "cross-talk." However, with elongated light sources, such as the tungsten filament lamp, it is difficult to shield the condenser lens matrix from direct radiation from the light source thus making the tubular elements 28 desirable. Further, for satisfactory "zooming," it is desirable to design the lens doublet system for under-coverage of the projection lenses 25. Thus, where it is possible to shield the light source from the condenser lens matrix and to design the lens doublet system for under-coverage of the projection lenses, it is possible to dispense with the tubular elements 28. Further, for good "zooming" it is desirable that the light source image occupy no more than one-half the minimum dimension of any projection lens 25. When such a relationship is provided, it is possible to provide zooming over a two-to-one range of angular beam width while still maintaining a controlled beam pattern and uniform intensity distribution.

In a specific embodiment of the invention constructed in accordance with FIGS. 1, 2 and 3, the diameter of the effective aperture 23 of the parabolic reflector 11 was fifteen inches, which was likewise the diameter of each of the condenser and projector matrix plates 20 and 26. Reflector 11 had a total depth $c$ of four and one-quarter inches and a focal length $a$ of three inches. In this embodiment, a two thousand watt tungsten lamp, Sylvania FEY was emloyed, that lamp having an axial filament length of one inch on the axis 12. Each of the plates 20 and 26 had one hundred effective lenses 18 and 25, respectively, the complete lenses (as opposed to the cut-off lenses around the periphery) being rectangular and 1.117 inch by 1.493 inch. Each of these lenses had a focal length of 135 mm. or approximately 5.3 inches which was thus the spacing distance $f$ between the condensing and projecting lens matrices 17 and 24. The axial spacing $b$ between the outer edge 19 of the parabolic reflector 11 and the condensing lens matrix 17 was three inches. This arrangement provided a spread or divergence of the projected beam of 12° vertically and 16° horizontally. At a distance of twenty feet from the projection lens matrix 24, a rectangular projected spot four and one-half feet by six feet was provided having a uniform intensity of five hundred foot candles or a total beam luminous content of thirteen thousand five hundred lumens. At one thousand feet, the projected spot would be approximately two hundred feet by two hundred and seventy feet.

While there have been described above the principles of this invention in connection with specific apparatus, it is to be clearly understood that this description is made only by way of example and not as a limitation to the scope of the invention.

What is claimed is:
1. Searchlight apparatus comprising: a substantially parabolic reflector having an axis and a focal point on said axis; a light source positioned adjacent said focal point; said reflector having an effective aperture for reflection of light emitted by said source; a first matrix of closely spaced, relatively small condensing lens elements disposed in a plane normal to said axis and spaced axially from said source for receiving light from said reflector, said first matrix having substantially the same outside diameter as said effective aperture, each of said lens elements of said first matrix having the same predetermined focal length; and a second matrix of closely spaced, relatively small, diverging lens elements disposed in a plane normal to said axis and spaced axially from said first matrix, said second matrix having substantially the same outside diameter as said effective aperture, each of said lens elements of said second matrix having the same predetermined focal length, said second matrix having the same number of lens elements as said first matrix, each lens element of said second matrix being axially aligned with a respective lens element of said first matrix for receiving light therefrom.

2. The apparatus of claim 1 wherein each lens element of said second matrix is substantially the same size and configuration as the respective lens element of said first matrix.

3. The apparatus of claim 1 wherein the lens elements of said first and second matrices have the same focal length.

4. The apparatus of claim 1 wherein said second matrix is spaced from said first matrix by substantially the focal length of said lens elements of said first matrix.

5. The apparatus of claim 1 wherein each lens element of said second matrix is substantially the same size and configuration as the respective lens element of said first matrix, the lens elements of said first and second matrices having the same focal length, said second matrix being spaced from said first matrix by substantially said focal length.

6. The apparatus of claim 1 further comprising means for confining and directing light passing through each lens of said first matrix in a path to impinge upon only the respective lens of said second matrix thereby eliminating "cross-talk."

7. The apparatus of claim 6 wherein said confining and directing means comprises a plurality of tubular elements each extending between respective lenses of said first and second matrices.

8. The apparatus of claim 7 wherein each of said tubular elements has a blackened interior surface.

9. The apparatus of claim 7 wherein each lens element of said second matrix is substantially the same size and configuration as the respective lens element of said first matrix, each of said tubular elements having a cross-sectional size and configuration substantially the same as the respective lens elements.

10. The apparatus of claim 9 wherein said tubular elements are joined in a honeycomb structure.

11. The apparatus of claim 1 wherein said lens elements of said first and second matrices are respectively adhered to and supported by first and second light-transmissive plate members.

12. The apparatus of claim 11 wherein said lens elements are adhered to the facing surfaces of said plate members.

13. The apparatus of claim 1 further comprising means for selectively adjusting the axial spacing between said matrices.

14. The apparatus of claim 13 wherein said second matrix is fixed and said first matrix is selectively adjusted.

15. The apparatus of claim 13 wherein said axial spacing between matrices is selectively adjustable from less than to more than the focal length of the lens elements of said first matrix.

References Cited

UNITED STATES PATENTS

| | | | |
|---|---|---|---|
| 1,141,718 | 6/1915 | Martin | 240—46.31 |
| 1,557,729 | 10/1925 | Siefert | 240—41.3 |
| 2,803,163 | 8/1957 | Ulffers | 240—41.3 XR |
| 2,887,566 | 5/1959 | Marks | 240—46.31 XR |

NORTON ANSHER, Primary Examiner

D. S. STALLARD, Assistant Examiner

U.S. Cl. X.R.

240—46.39